United States Patent
Saiki

(10) Patent No.: US 8,303,703 B2
(45) Date of Patent: Nov. 6, 2012

(54) EXHAUST PIPE PAINT, METHOD FOR FORMING SURFACE COAT LAYER ON EXHAUST PIPE BASE, AND EXHAUST PIPE

(75) Inventor: Kenzo Saiki, Ogaki (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 244 days.

(21) Appl. No.: 12/647,401

(22) Filed: Dec. 25, 2009

(65) Prior Publication Data

US 2010/0180798 A1 Jul. 22, 2010

(30) Foreign Application Priority Data

Jan. 22, 2009 (JP) ................. 2009-012328

(51) Int. Cl.
- *C04B 41/50* (2006.01)
- *C04B 14/04* (2006.01)
- *C09D 4/00* (2006.01)
- *C09D 5/00* (2006.01)
- *C09D 11/00* (2006.01)
- *C03C 8/14* (2006.01)
- *C03C 8/16* (2006.01)

(52) U.S. Cl. ............... 106/287.1; 106/31.95; 106/489; 501/17; 501/20

(58) Field of Classification Search ............ 501/15, 501/17, 18, 20, 21, 26; 106/287.1, 287.17, 106/600, 38.3, 38.9, 31.95, 676, 489

See application file for complete search history.

(56) References Cited

U.S. PATENT DOCUMENTS

| 4,118,450 | A | * | 10/1978 | Nakamura et al. ............. 264/43 |
| 4,332,618 | A | * | 6/1982 | Ballard ........................ 106/605 |
| 4,523,662 | A |   | 6/1985 | Tanaka et al. |
| 4,676,064 | A |   | 6/1987 | Narita et al. |
| 4,680,239 | A | * | 7/1987 | Yano et al. .................... 428/688 |
| 5,095,665 | A | * | 3/1992 | Nagata et al. ................... 51/307 |
| 5,102,698 | A | * | 4/1992 | Cavalier et al. ............. 427/376.1 |
| 5,909,881 | A |   | 6/1999 | Segawa |
| 2002/0009622 | A1 |  | 1/2002 | Goodson |
| 2008/0127855 | A1 |  | 6/2008 | Wilson |

FOREIGN PATENT DOCUMENTS

| EP | 1769838 | 4/2007 |
| JP | 7-301113 | 11/1995 |
| JP | 2005-194962 | 7/2005 |
| WO | WO 2005/005680 | 1/2005 |

OTHER PUBLICATIONS

European Search Report issued by the European Patent Office dated Apr. 7, 2010.

* cited by examiner

*Primary Examiner* — Noah Wiese
(74) *Attorney, Agent, or Firm* — Ditthavong Mori & Steiner, P.C.

(57) ABSTRACT

An exhaust pipe paint for application to an exhaust pipe base includes an inorganic glass particle, an inorganic particle, and at least one of an inorganic binder and an inorganic binder precursor.

12 Claims, 5 Drawing Sheets

20 μm

20 μm

30 μm

20 μm

A-A line cross-sectional view

B-B line cross-sectional view

EXHAUST PIPE PAINT, METHOD FOR FORMING SURFACE COAT LAYER ON EXHAUST PIPE BASE, AND EXHAUST PIPE

CROSS-REFERENCE TO RELATED APPLICATIONS

The present application claims priority under 35 U.S.C. §119 to Japanese Patent Application No. JP 2009-012328 filed on Jan. 22, 2009, the contents of which are incorporated herein by reference in their entirety.

BACKGROUND OF THE INVENTION

1. Field of the Invention

The present invention relates to an exhaust pipe paint, a method for forming a surface coat layer on an exhaust pipe base, and an exhaust pipe.

2. Discussion of the Background

A catalytic converter is provided in the path of an exhaust pipe to treat toxic substances, such as harmful gas contained in exhaust gas discharged from an engine.

It is necessary to keep exhaust gas, an exhaust pipe through which the exhaust gas passes, etc. at a temperature suitable for catalytic activation (hereinafter, also referred to as a catalyst activation temperature) in order to improve conversion efficiency of toxic substances by a catalytic converter.

However, in high-speed engine operation, an exhaust gas temperature may temporarily exceed a high temperature of 1000° C. and may exceed the upper limit of a catalyst activation temperature. Consequently, problematically, it may be difficult to convert exhaust gas efficiently, or catalyst may be deteriorated.

In order to solve the problem, JP-A 2005-194962 discloses an exhaust pipe that has a double-pipe structure and in which a movable heat transfer member is provided between the inner pipe and the outer pipe of the double pipe. The exhaust pipe has a high heat dissipation, and it is presumed that an exhaust gas temperature can be prevented from exceeding the upper limit of a catalyst activation temperature even in high-speed engine operation.

The contents of JP-A 2005-194962 are incorporated herein by reference in their entirety.

SUMMARY OF THE INVENTION

According to one aspect of the present invention, an exhaust pipe paint is for application to an exhaust pipe base. The exhaust pipe paint includes an inorganic glass particle, an inorganic particle, and at least one of an inorganic binder and an inorganic binder precursor.

According to another aspect of the present invention, a method for forming a surface coat layer on an exhaust pipe base includes: applying an exhaust pipe paint to an exhaust pipe base to manufacture a painted pipe, said exhaust pipe paint including an inorganic glass particle, an inorganic particle, and at least one of an inorganic binder and an inorganic binder precursor; attaching the painted pipe to an exhaust port of an engine; and discharging exhaust gas from the exhaust port of the engine and thereby passing the exhaust gas through the painted pipe.

According to further aspect of the present invention, an exhaust pipe includes an exhaust pipe base, and a surface coat layer formed on the exhaust pipe base by heating an exhaust pipe paint applied to the exhaust pipe base. The exhaust pipe paint includes an inorganic glass particle, an inorganic particle, and at least one of an inorganic binder and an inorganic binder precursor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
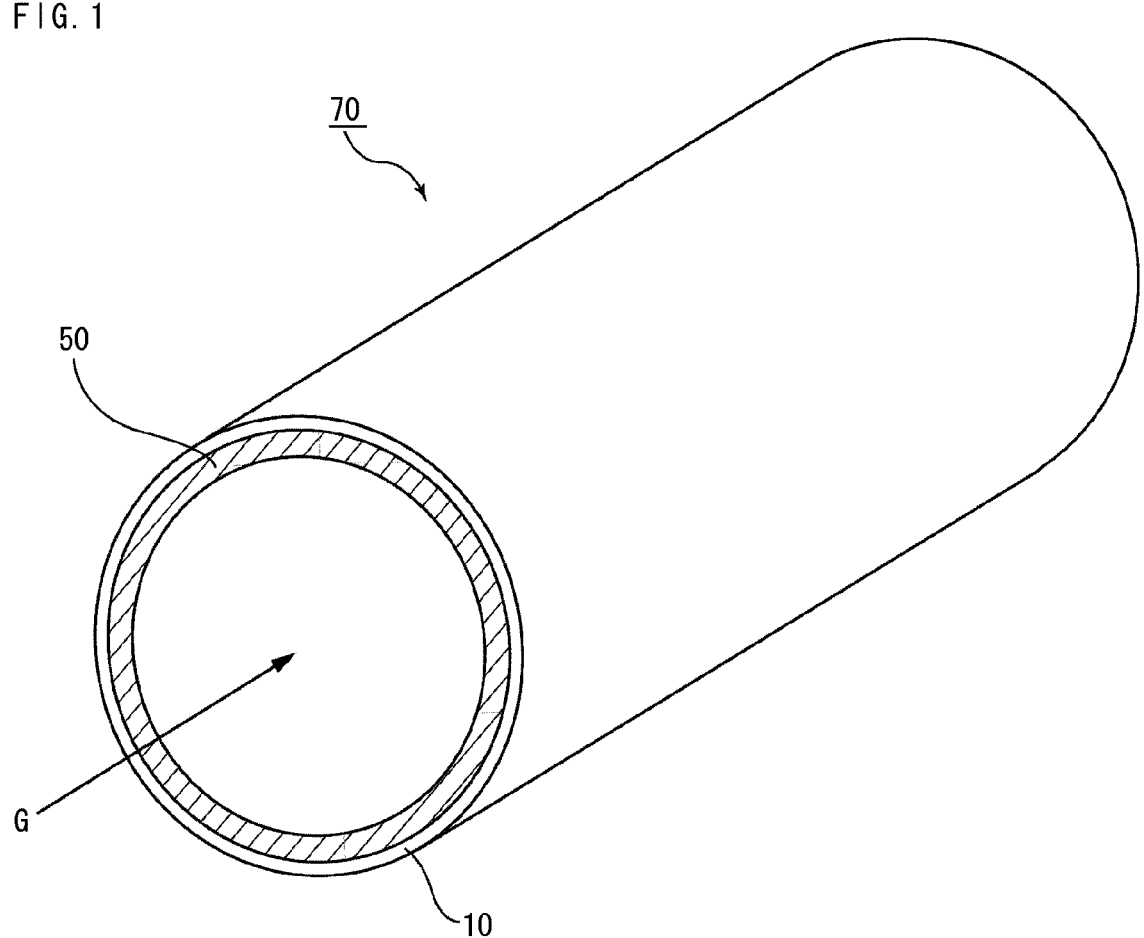
FIG. 1 is a perspective view schematically illustrating an exhaust pipe base (painted pipe) to which an exhaust pipe paint of an embodiment of the present invention is applied.

The embodiments will now be described with reference to the accompanying drawings, wherein like reference numerals designate corresponding or identical elements throughout the various drawings.

That is, an exhaust pipe paint according to an embodiment of the present invention, which is for application to an exhaust pipe base, includes: an inorganic glass particle; an inorganic particle; and at least one of an inorganic binder and an inorganic binder precursor.

By using the exhaust pipe paint according to the embodiment of the present invention, it is easier to manufacture an exhaust pipe having predetermined heat dissipation by taking advantage of heat of exhaust gas without performing a heating treatment.

The exhaust pipe paint according to the embodiment of the present invention is applied to the peripheral surface of a substantially-cylindrical exhaust pipe base, and a drying treatment is performed to manufacture a painted pipe. The following will discuss an example of a method for manufacturing an exhaust pipe by using the painted pipe.

Figure 2A:
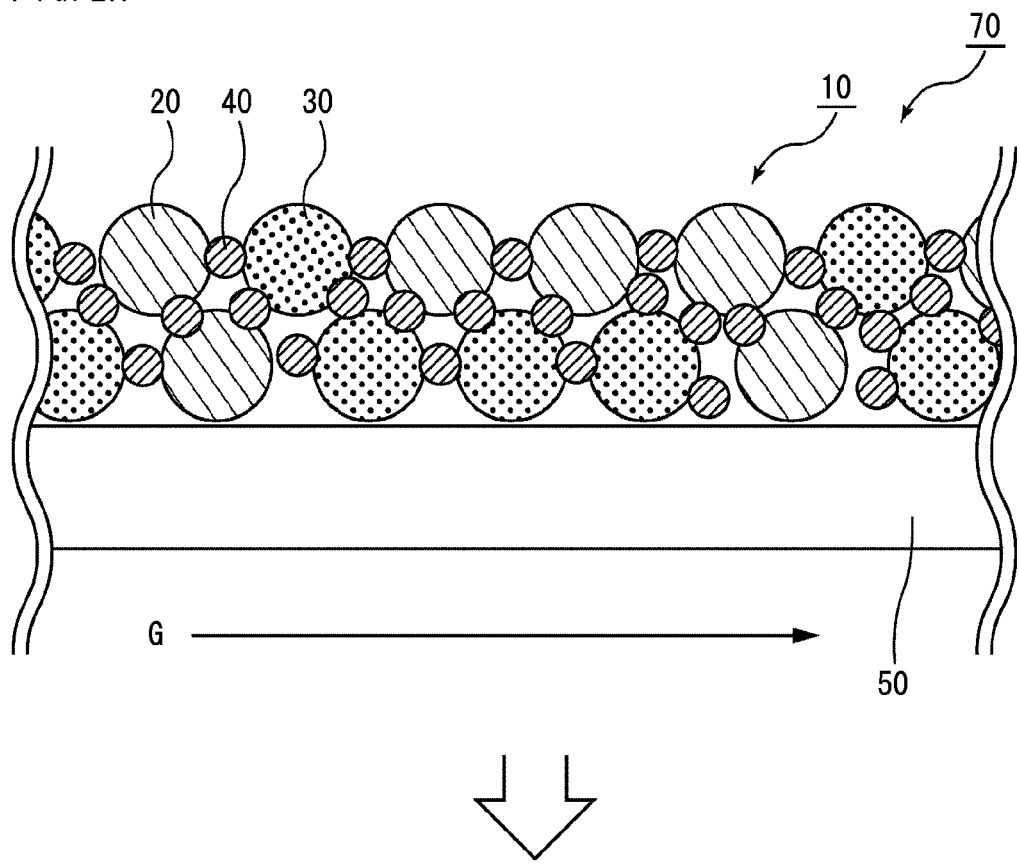
FIG. 2A is a partially enlarged cross-sectional view schematically illustrating a cross section obtained by cutting the painted pipe shown in FIG. 1 along the longitudinal direction thereof.
Figure 2B:
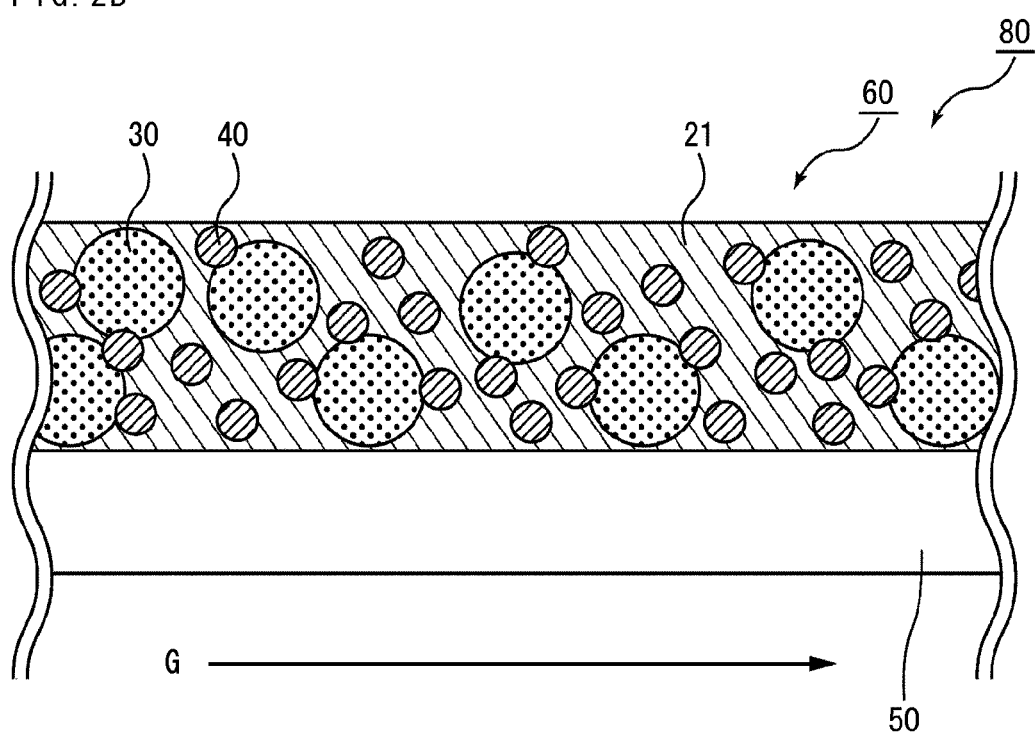
FIG. 2B is a partially enlarged cross-sectional view schematically illustrating a state in which heat of exhaust gas is applied to the painted pipe shown in FIG. 2A.

FIG. 1 is a perspective view schematically illustrating an exhaust pipe base (painted pipe) to which an exhaust pipe paint according to the embodiment of the present invention is applied. FIG. 2A is a partially enlarged cross-sectional view schematically illustrating a cross section obtained by cutting the painted pipe shown in FIG. 1 along the longitudinal direction thereof. FIG. 2B is a partially enlarged cross-sectional view schematically illustrating a state in which heat of exhaust gas is applied to the painted pipe shown in FIG. 2A.

In FIG. 1, the symbol G indicates exhaust gas and an arrow indicates the direction in which the exhaust gas flows.

A painted pipe 70 illustrated in FIG. 1 includes: a substantially-cylindrical exhaust pipe base 50; and an exhaust pipe paint (dispersoid layer) 10 that is applied to the peripheral surface of the exhaust pipe base 50 to have a predetermined thickness and is dried.

As illustrated in FIG. 2A, the dispersoid layer 10 includes an inorganic binder 40 that binds inorganic glass particles 20 and inorganic particles 30 (note that in the following description, the term "inorganic binder" also includes an inorganic binder obtained by hydrolyzing an inorganic binder precursor), and the inorganic glass particles 20 and the inorganic particles 30 are bound by the inorganic binder 40.

Therefore, in the painted pipe 70, the dispersoid layer 10 is securely fixed to the exhaust pipe base 50, and the dispersoid layer 10 is less likely to peel.

The following description will discuss an example of the case where the inorganic glass particles 20 have a softening temperature of about 700° C., the inorganic binder 40 has a softening temperature of higher than about 1000° C., the exhaust gas has a temperature of about 600° C. in engine startup operation, and the exhaust gas has a temperature of about 1000° C. in steady-state operation. The case is taken as an example because engine tends to be operated at a high load and high revolution in recent years for the purpose of improvement in engine output and in fuel consumption and it is assumed that the exhaust gas reaches a temperature of about 1000° C. in steady-state operation and temporarily reaches a temperature of higher than about 1000° C. in high-speed operation.

When the painted pipe 70 is attached to an engine (not illustrated) without performing a heating treatment on the painted pipe 70, exhaust gas G having a temperature of about 600° C. passes through the exhaust pipe base 50 in engine startup operation, heat of the exhaust gas G is transferred to the exhaust pipe base 50 and further to the dispersoid layer 10, and the exhaust pipe base 50 and the dispersoid layer 10 are heated to about 600° C.

However, since the inorganic binder 40 has a softening temperature of higher than about 1000° C. and does not soften at a temperature of about 600° C., the inorganic glass particles 20 and the inorganic particles 30 continues to be bound by the inorganic binder 40.

Thus, the dispersoid layer 10 is continuously fixed to the surface of the exhaust pipe base 50, and it is presumed that the dispersoid layer 10 is less likely to peel from the exhaust pipe base 50 even with engine vibration.

Then, after the engine shifts to steady-state operation, the temperature of exhaust gas G that was about 600° C. in startup operation gradually rises, and the temperature of the dispersoid layer 10 also increases with the rise.

However, even upon the increase in the temperature of the dispersoid layer 10, the inorganic binder 40 having a softening temperature of higher than about 1000° C. does not soften. Therefore, it is presumed that the inorganic glass particles 20 and the inorganic particles 30 continues to be bound by the inorganic binder 40, and the dispersoid layer 10 is less likely to peel from the exhaust pipe base 50 even with engine vibration.

It is supposed that when the temperature of the dispersoid layer 10 reaches about 700° C., the inorganic glass particles 20 having a softening temperature of about 700° C. softens, the softened inorganic glass particles 20 are integrated to form a glass substrate (inorganic glass), and the glass substrate, the inorganic particles 30, and the inorganic binder 40 are mixed.

Thereby, as illustrated in FIG. 2B, a surface coat layer 60 having the glass substrate 21 in which the inorganic particles 30 and inorganic binder 40 are dispersed is formed.

Thus, the dispersoid layer 10 is heated by passing the exhaust gas G through the painted pipe 70, and the surface coat layer 60 is more easily formed on the peripheral surface of the exhaust pipe base 50.

That is, in the exhaust pipe paint according to the embodiment of the present invention, by taking advantage of the heat of exhaust gas G, an exhaust pipe 80 can be manufactured in which the surface coat layer 60 having the glass substrate 21 in which the inorganic particles 30 and inorganic binder 40 are dispersed is more easily formed on the peripheral surface of the exhaust pipe base 50.

Figure 3A:
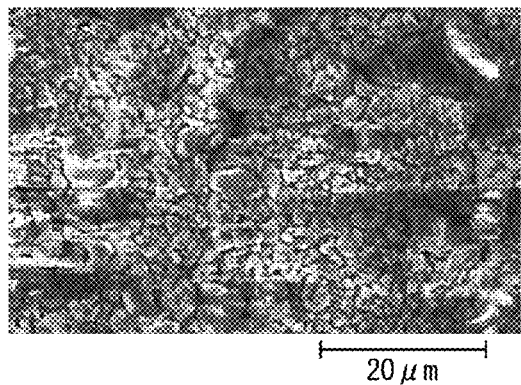
FIG. 3A is a scanning electron microscope photograph illustrating the state of the surface of a dried exhaust pipe paint that is applied to an exhaust pipe base.
Figure 3B:
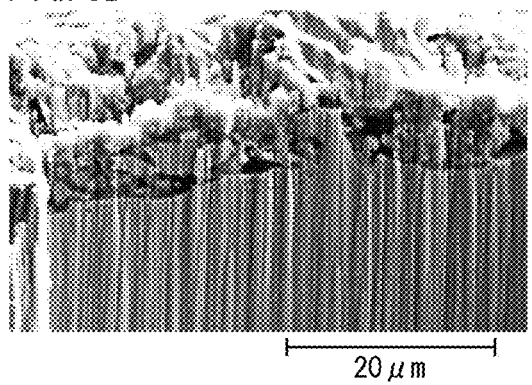
FIG. 3B is a scanning electron microscope photograph illustrating the state of the cross section of the exhaust pipe base and a dried exhaust pipe paint.
Figure 3C:
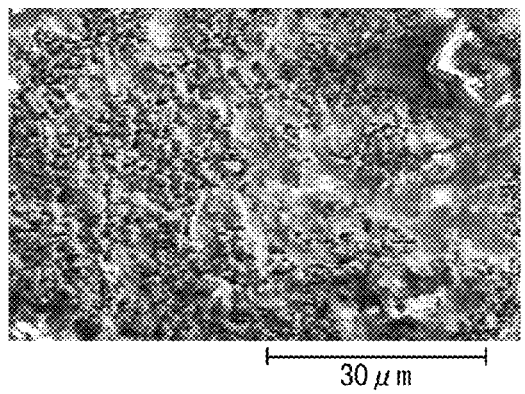
FIG. 3C is a scanning electron microscope photograph illustrating the state of the surface of a surface coat layer formed by heating the dried exhaust pipe paint.
Figure 3D:
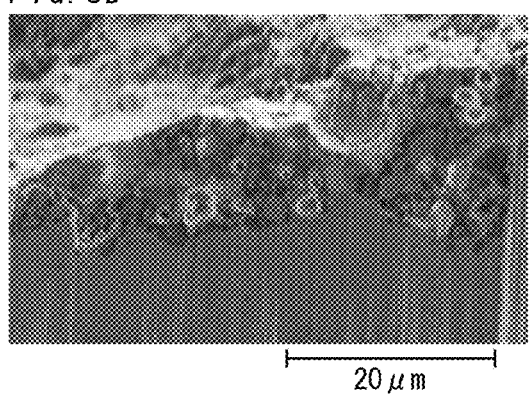
FIG. 3D is a scanning electron microscope photograph illustrating the state of the cross section of the surface coat layer.

FIG. 3A is a scanning electron microscope photograph illustrating the state of the surface of an exhaust pipe paint (dispersoid layer) that is applied to an exhaust pipe base and then dried. FIG. 3B is a scanning electron microscope photograph illustrating the state of the cross section of the exhaust pipe base and the dispersoid layer. FIG. 3C is a scanning electron microscope photograph illustrating the state of the surface of a surface coat layer formed by heating the dispersoid layer. FIG. 3D is a scanning electron microscope photograph illustrating the state of the cross section of the surface coat layer.

As illustrated in FIG. 3A and FIG. 3B, in a dispersoid layer before becoming a surface coat layer by heat of exhaust gas, inorganic glass particles and the like exist in the form of particles and gaps are formed. As illustrated in FIG. 3C and FIG. 3D, in a surface coat layer formed by applying heat of exhaust gas to a dispersoid layer, almost no gaps exist probably because inorganic glass particles softened, and inorganic particles and the like are mixed thereinside.

The exhaust pipe paint according to the embodiment of the present invention includes inorganic particles 30.

Therefore, when a material having a comparatively high emissivity is used as the inorganic particles 30, heat tends to be efficiently radiated from the inorganic particles 30 in comparison with the case where the exhaust pipe paint does not include the inorganic particles 30. Thus, in the exhaust pipe 80 manufactured by using the exhaust pipe paint according to the embodiment of the present invention, since the heat of exhaust gas G that has flowed in the exhaust pipe 80 is transmitted to the exhaust pipe 80 and the heat transmitted to the exhaust pipe 80 tends to be efficiently radiated to the outside through the surface coat layer 60 (inorganic particles 30), the temperature of the exhaust gas G that flows out of the exhaust pipe 80 easily falls.

As a result, even when the exhaust gas reaches a temperature of about 1000° C. in engine steady-state operation and even in the case where the exhaust gas G temporarily exceeds a temperature of about 1000° C. in high-speed operation, the temperature of the exhaust gas G that flows out of the exhaust pipe 80 is less likely to exceed the upper limit of a catalyst activation temperature.

On the other hand, when a material having a comparatively low emissivity is used as inorganic particles, heat is less likely to be radiated from the inorganic particles. Therefore, by using the exhaust pipe paint for an exhaust pipe for an engine, such as a diesel engine that emits exhaust gas having a comparatively low temperature, it is easier to prevent the temperature of the exhaust gas from being less than the lower limit of a catalyst activation temperature.

The exhaust pipe paint according to the embodiment of the present invention contains the inorganic glass particle including a low-melting glass, and a softening temperature of the low-melting glass is lower than a softening temperature of the inorganic binder.

When the exhaust pipe paint according to the embodiment of the present invention is heated, the inorganic glass particles made of the low-melting glass soften upon reaching the softening temperature of the low-melting glass; whereas the inorganic binder having a softening temperature higher than a softening temperature of the low-melting glass is less likely to soften. Therefore, it is presumed that the inorganic glass particles and the inorganic particles are more likely to continue to be bound until the inorganic glass particles soften.

Therefore, it is supposed that before the inorganic glass particles soften to form a surface coat layer, a dispersoid layer is less likely to peel from the exhaust pipe base even with engine vibration.

Thus, in the exhaust pipe paint according to the embodiment of the present invention, the effect of the exhaust pipe paint according to the embodiment of the present invention is more likely to be suitably exerted.

The exhaust pipe paint according to the embodiment of the present invention contains the low-melting glass having a softening temperature of from about 300° C. to about 1000° C.

In accordance with the exhaust pipe paint according to the embodiment of the present invention, the low-melting glass has a softening temperature of from about 300° C. to about 1000° C., and the temperature of the exhaust gas in the process of the engine shifting from startup operation to steady-state operation (for example, from about 600° C. to about 1000° C.) is not so different from the softening temperature of the low-melting glass.

Therefore, in the process of the engine shifting from startup operation to steady-state operation, it is easier to soften the inorganic glass particles by using heat of exhaust gas. Moreover, the viscosity of the softened inorganic glass particles does not become too low, and the dispersoid layer is less likely to peel from the exhaust pipe base before the formation of the surface coat layer.

Thus, in the exhaust pipe paint according to the embodiment of the present invention, the effect of the exhaust pipe paint according to the embodiment of the present invention is more likely to be suitably exerted.

On the other hand, when the low-melting glass has a softening temperature of not lower than about 300° C., the softening temperature of the low-melting glass is not significantly lower than the temperature of the exhaust gas in the process of the engine shifting from startup operation to steady-state operation. Therefore, in the process of the engine shifting from startup operation to steady-state operation, the viscosity of the softened inorganic glass particles does not become too low, and the dispersoid layer is less likely to peel from the exhaust pipe base before the formation of the surface coat layer. Thus, it is easier to form the surface coat layer.

When the softening temperature of the low-melting glass is about 1000° C. or lower, the softening temperature of the low-melting glass is not far higher than the temperature (about 1000° C.) of the exhaust gas in engine steady-state operation. Accordingly, it is less likely to be difficult to form the surface coat layer by taking advantage of heat of exhaust gas.

The exhaust pipe paint according to the embodiment of the present invention has an emissivity of about 0.7 or more after a drying treatment.

The exhaust pipe paint according to the embodiment of the present invention contains the inorganic particle including at least one oxide of manganese, iron, copper, cobalt, and chromium.

The exhaust pipe paint according to the embodiment of the present invention has a comparatively high emissivity of about 0.7 or more after a drying treatment.

In the exhaust pipe paint according to the embodiment of the present invention, a material whose emissivity is comparatively high among inorganic materials is used as inorganic particles.

For this reason, even when hot exhaust gas flows in an exhaust pipe using the exhaust pipe paint according to the embodiment of the present invention in steady-state operation and high-speed operation of the engine, since heat of exhaust gas tends to be efficiently radiated to the outside through the surface coat layer (inorganic particles), the temperature of the exhaust gas discharged from the exhaust pipe easily falls and is easily controlled within the range of a catalyst activation temperature.

A method for forming a surface coat layer on an exhaust pipe base according to the embodiment of the present invention includes: applying the exhaust pipe paint according to the embodiment of the present invention to the exhaust pipe base to manufacture a painted pipe; attaching the painted pipe to an exhaust port of an engine; and discharging exhaust gas from the exhaust port of the engine and thereby passing the exhaust gas through the painted pipe.

The method for forming a surface coat layer on an exhaust pipe base according to the embodiment of the present invention includes: attaching to the exhaust port of the engine the painted pipe that is painted with the exhaust pipe paint according to the embodiment of the present invention; and passing the exhaust gas discharged from the exhaust port through the painted pipe.

Thereby, it is easier to manufacture an exhaust pipe having predetermined heat dissipation by taking advantage of heat of exhaust gas without performing a heating treatment.

The reason for this is omitted because it is given in the description of the exhaust pipe paint according to the embodiment of the present invention.

In the process of manufacturing the exhaust pipe, since there is no necessity of performing a heating treatment that requires high energy, it is easier to reduce the environmental impact while controlling the emission amount of $CO_2$ and the like.

An exhaust pipe according to the embodiment of the present invention includes: an exhaust pipe base; and a surface coat layer formed on the exhaust pipe base, wherein the surface coat layer is formed by heating the exhaust pipe paint according to the embodiment of the present invention, the exhaust pipe paint being applied to the exhaust pipe base.

In the exhaust pipe according to the embodiment of the present invention, the surface coat layer is formed on the exhaust pipe base by heating the exhaust pipe paint according to the embodiment of the present invention.

In the surface coat layer thus formed, as discussed in the description of the exhaust pipe paint according to the embodiment of the present invention, the inorganic particles and the inorganic binder are mixed inside the inorganic glass (glass substrate) (see FIG. 2B). Therefore, the inorganic glass and inorganic particles are bound by the inorganic binder, and it is presumed that the viscosity of the surface coat layer is higher than the viscosity of a surface coat layer that does not contain the inorganic binder. Thus, not only in engine startup operation and steady-state operation but also in high-speed engine operation, when the temperature of the exhaust pipe temporarily exceeds about 1000° C., the viscosity of the surface coat layer is presumably less likely to fall, and the surface coat layer is less likely to drop from the exhaust pipe base even with engine vibration.

In the exhaust pipe according to the embodiment of the present invention, the surface coat layer includes inorganic particles.

Therefore, when a material having a comparatively high emissivity is used as the inorganic particles, heat tends to be efficiently radiated from the inorganic particles in comparison with the case where the surface coat layer does not include the inorganic particles. Thus, since the heat of exhaust gas that has flowed in the exhaust pipe is transmitted to the exhaust pipe, and the heat transmitted to the exhaust pipe tends to be efficiently radiated to the outside through the surface coat layer (inorganic particles), the temperature of the exhaust gas that flows out of the exhaust pipe easily falls.

Accordingly, even when the temperature of the exhaust gas that has flowed in the exhaust pipe temporarily exceeds about 1000° C. in high-speed engine operation, the temperature of the exhaust gas that flows out of the exhaust pipe is less likely to exceed the upper limit of a catalyst activation temperature.

On the other hand, when a material having a comparatively low emissivity is used as inorganic particles, heat is less likely to be radiated from inorganic particles. Therefore, when the exhaust pipe is attached to a diesel engine or the like that emits exhaust gas having a comparatively low temperature, it is easier to prevent the temperature of exhaust gas from being less than the lower limit of a catalyst activation temperature.

DESCRIPTION OF EMBODIMENTS

First Embodiment

The following will discuss a first embodiment, one embodiment of the present invention.

First, the exhaust pipe paint of the present embodiment will be described.

The exhaust pipe paint of the present embodiment includes inorganic glass particles, inorganic particles, and at least one of an inorganic binder and an inorganic binder precursor.

The inorganic glass particles preferably includes a low-melting glass having a softening temperature of from about 300° C. to about 1000° C., and the softening temperature is preferably lower than the softening temperature of the inorganic binder.

The inorganic particle preferably includes at least one oxide of manganese, iron, copper, cobalt, and chromium. The exhaust pipe paint preferably has an emissivity of about 0.7 or more after a drying treatment.

The softening temperature of the inorganic binder is preferably in excess of about 1000° C. and higher than the softening temperature of the low-melting glass. The inorganic binder can bind the inorganic glass particles and the inorganic particles.

Examples of the inorganic binder include: lithium oxide particles; an inorganic binder, which is derived from an inorganic binder precursor to be mentioned later; and the like.

The inorganic binder precursor is not particularly limited as long as it can be changed to an inorganic binder by hydrolysis, a heating treatment, or the like, and examples thereof include lithium alkoxide, such as lithium methoxide and lithium ethoxide.

The following will discuss the painted pipe of the present embodiment.

The painted pipe of the present embodiment includes: a substantially-cylindrical exhaust pipe base mainly made of metal; and an exhaust pipe paint of the present embodiment that has been applied to the substantially entire peripheral surface of the exhaust pipe base to have a predetermined thickness and then dried.

Since the detailed configuration of the painted pipe of the present embodiment is described with reference to FIG. 1 and FIG. 2A, description thereof will be omitted.

Examples of the material of the exhaust pipe base include: metals, such as stainless steel, steel, iron, and copper; nickel alloys, such as Inconel, Hastelloy, and Invar; and the like. Since these metal materials have high thermal conductivity, they can contribute to improvement in heat dissipation of the exhaust pipe with the use of the painted pipe.

The peripheral surface of the exhaust pipe base is a roughened surface on which irregularities are formed.

The maximum height Rz of the irregularities of the roughened surface is desirably from about 1.5 μm to about 15

When the maximum height Rz of the irregularities of the peripheral surface of the exhaust pipe base is from about 1.5 μm to about 15 μm, adhesion is strong between the exhaust pipe base and the exhaust pipe paint (dispersoid layer) or the surface coat layer.

When the maximum height Rz is not less than about 1.5 μm, since the surface area is less likely to be small, adhesion may be less likely to be insufficient between the exhaust pipe base and the exhaust pipe paint (dispersoid layer) or the surface coat layer.

When the maximum height Rz not more than about 15 μm, an exhaust pipe paint (dispersoid layer) or a surface coat layer is more likely to be certainly formed on the surface of an exhaust pipe base. This is presumably because when the maximum height Rz is not too large, it is presumed that the exhaust pipe paint may fill the depressions of the irregularities formed on the surface of the exhaust pipe base and gaps may be less likely to be formed in the depressions.

The maximum height Rz is more desirably from about 3.0 μm to about 14 μm, and further desirably from about 3.5 μm to about 13 μm.

The maximum height Rz is calculated in conformity with JIS B 0601. The content of JIS B 0601 is incorporated herein by reference in its entirety.

When conditions such as the material of the exhaust pipe base make it possible to prevent the exhaust pipe paint from dropping, the roughened surface is not necessarily formed.

Examples of a method for roughening the peripheral surface of the exhaust pipe base include roughening treatments, such as a sandblast treatment, an etching treatment, and a high-temperature oxidation treatment. These roughening treatments may be performed independently or two or more thereof may be performed in combination.

The following will discuss a method for manufacturing an exhaust pipe paint of the present embodiment (process 1), a method for manufacturing a painted pipe of the present embodiment (process 2), and a method for forming a surface coat layer on the exhaust pipe base according to the present embodiment (process 3). The exhaust pipe of the present embodiment can be manufactured through the below-described processes 1 to 3.

1. Method for Manufacturing Exhaust Pipe Paint (1-1) Inorganic glass particles including a low-melting glass are dry mixed with inorganic particles at a predetermined blending ratio to prepare mixed powder.

Here, the inorganic glass particles may be manufactured by grinding coarse powder of the low-melting glass to have a predetermined particle size, shape, and the like by virtue of a ball mill or the like. The inorganic particles may be manufactured by grinding coarse powder of a predetermined inorganic material to have a predetermined particle size, shape, and the like by virtue of a ball mill or the like.

(1-2) After weighing a predetermined amount of lithium alkoxide as an inorganic binder precursor, the lithium alkoxide is added to the mixed powder and wet mixed to manufacture an exhaust pipe paint.

2. Method for Manufacturing Painted Pipe (2-1) A roughening treatment is performed on the surface of the exhaust pipe base, and irregularities are formed on the surface of the exhaust pipe base to give a roughened surface.

(2-2) Next, the exhaust pipe paint manufactured in (1-2) is uniformly applied to the surface of the roughened exhaust pipe base by spray coating.

(2-3) After performing a pre-drying treatment, at room temperature for several minutes to tens of hours, on the exhaust pipe base, to which the exhaust pipe paint has been applied, a drying treatment is performed on the exhaust pipe base in a drying apparatus at a temperature of from about 50° C. to about 300° C. for from about 10 minutes to about 1 hour to manufacture a painted pipe.

3. Method for Forming Surface Coat Layer on Exhaust Pipe Base

In the method for forming a surface coat layer on an exhaust pipe base according to the present embodiment, an exhaust pipe can be manufactured by taking advantage of heat of exhaust gas without performing a heating treatment.

The following will discuss a method for forming a surface coat layer on an exhaust pipe base according to the present embodiment with reference to drawings by exemplifying the case of manufacturing an exhaust manifold to be attached to an automobile engine by the method for forming a surface coat layer on an exhaust pipe base according to the present embodiment.

Figure 4:
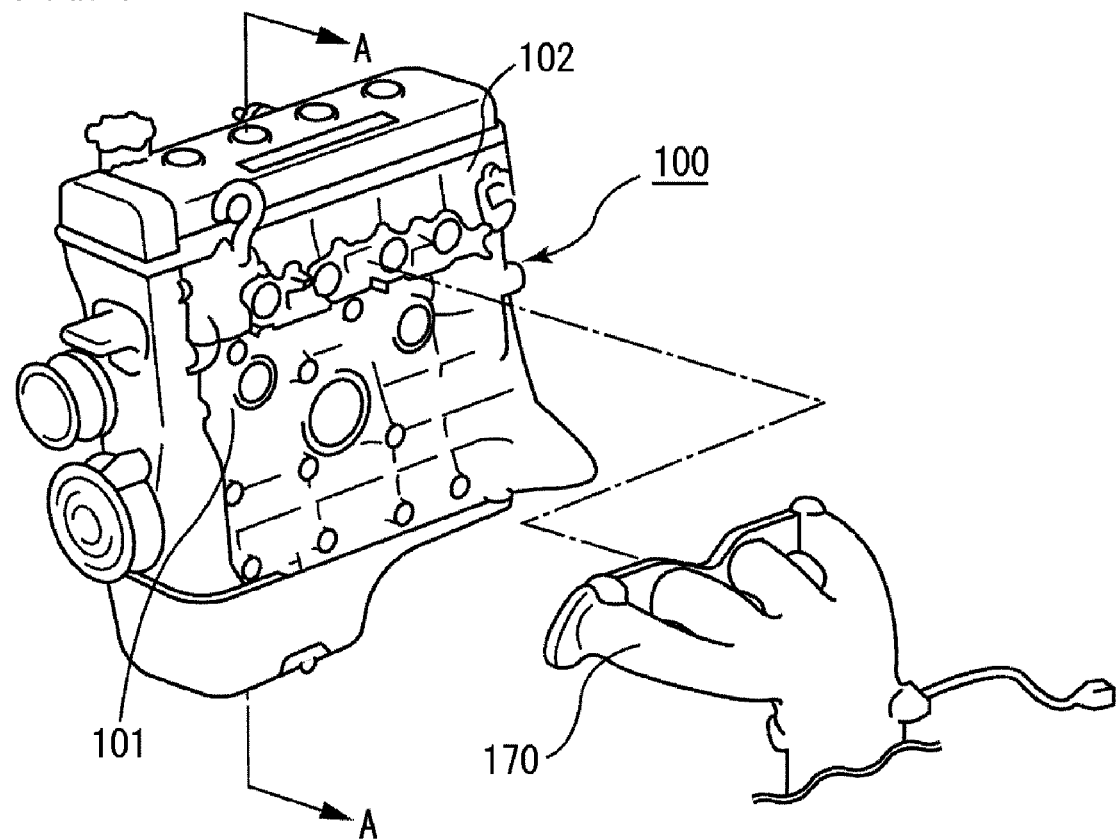
FIG. 4 is an exploded perspective view schematically illustrating an automobile engine and a painted pipe of a first embodiment to be attached to the automobile engine.

FIG. 4 is an exploded perspective view schematically illustrating an automobile engine and a painted pipe of the present embodiment to be attached to the automobile engine.

Figure 5A:
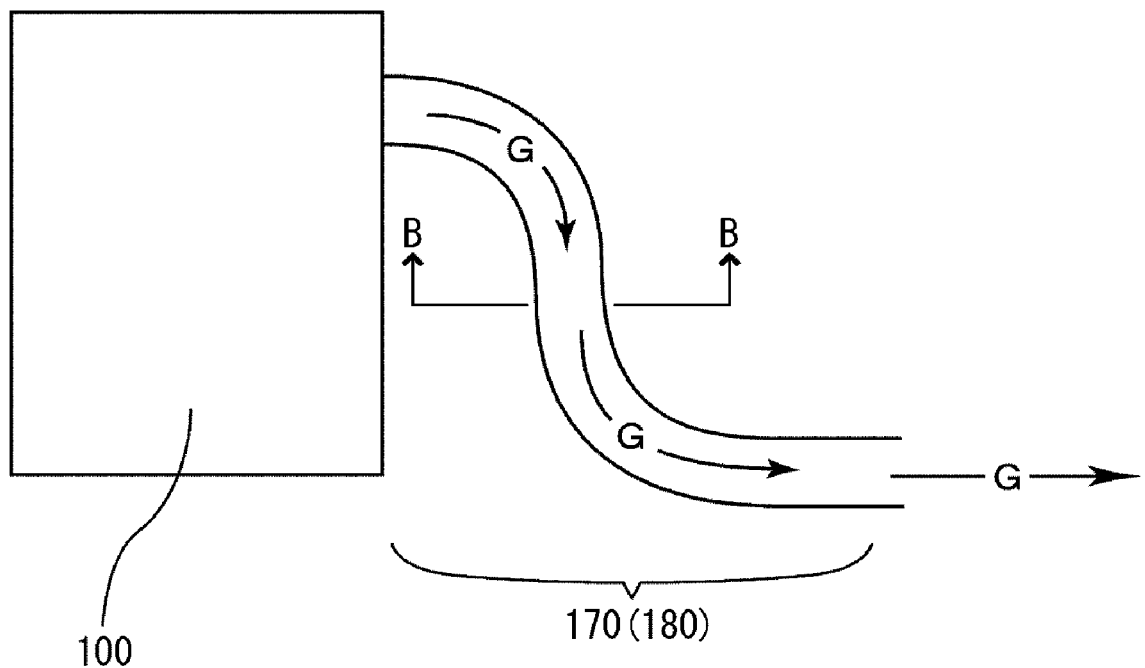
FIG. 5A is an A-A line cross-sectional view of FIG. 4.
Figure 5B:
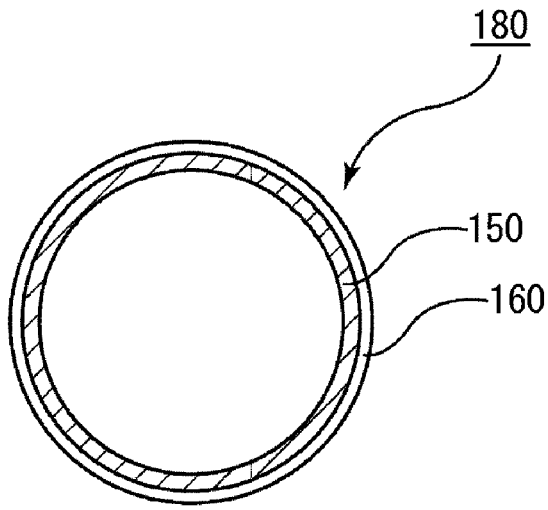
FIG. 5B is a B-B line cross-sectional view of FIG. 5A.

FIG. 5A is an A-A line cross-sectional view of FIG. 4, and FIG. 5B is a B-B line cross-sectional view of FIG. 5A.

In FIG. 5A, the symbol G indicates exhaust gas and an arrow indicates the direction in which the exhaust gas flows.

(3-1) According to the processes 1 and 2, the exhaust pipe paint is applied to the base for an exhaust manifold to manufacture a painted pipe for an exhaust manifold and then dried.

The manufactured painted pipe for an exhaust manifold is attached to an exhaust port of an automobile engine.

Specifically, as illustrated in FIG. 4, one end of a painted pipe 170 for an exhaust manifold is attached to one side face of a cylinder head 102 provided on the top of a cylinder block 101 of an automobile engine 100.

Attachment of the painted pipe 170 for an exhaust manifold allows exhaust gases to collect from the respective cylinders.

The automobile engines are not particularly limited, and in the present embodiment, conventionally known automobile engines in which the exhaust gas has a temperature of about 600° C. in startup operation and has a temperature of about 1000° C. in steady-state operation are used as the automobile engines.

Conventionally known catalytic converters or the like may be attached, if necessary, to the other end of the base (not illustrated) for an exhaust manifold.

(3-2) Subsequently, an automobile engine is operated. Thereby, as illustrated in FIG. 5A, exhaust gas G discharged from the automobile engine 100 passes through the painted pipe 170 for an exhaust manifold.

(3-3) A surface coat layer is formed by keeping, for from about 10 minutes to about 1 hour, a temperature of the exhaust gas of from about 300° C. to about 1000° C., the temperature exceeding the softening temperature of the inorganic glass particles.

Since the detailed process of forming a surface coat layer by heat of exhaust gas is described with reference to FIG. 1, FIG. 2A and FIG. 2B, description thereof will be omitted.

Through the above processes, an exhaust manifold 180 can be manufactured from the painted pipe 170 for an exhaust manifold by taking advantage of the heat of exhaust gas.

Here, an exhaust pipe has been described that can be manufactured by attaching the painted pipe to the engine exhaust port and taking advantage of the heat of exhaust gas. Additionally, an exhaust manifold 180 can also be manufactured by heating the painted pipe 170 for an exhaust manifold by virtue of a heating furnace or the like for from about 10 minutes to about 1 hour at a temperature of from about 300° C. to about 1000° C., the temperature exceeding the softening temperature of the inorganic glass particles.

As illustrated in FIG. 5B, the exhaust pipe of the present embodiment manufactured through the processes 1 to 3 is the exhaust pipe 180 formed by heating the exhaust pipe paint of the present embodiment, which has been applied to the exhaust pipe base 150. The exhaust pipe 180 includes an exhaust pipe base 150 and a surface coat layer 160 formed on the peripheral surface of the exhaust pipe base 150. The surface coat layer 160 is formed by heating the exhaust pipe paint of the present embodiment, and the exhaust pipe paint includes inorganic glass particles, inorganic particles, and at least one of an inorganic binder and an inorganic binder precursor.

The surface coat layer 160 includes the inorganic particles and the inorganic binder mixed in the inorganic glass.

Here, the inorganic glass is a low-melting glass having a softening temperature of from about 300° C. to about 1000° C., and the softening temperature of the low-melting glass is lower than the softening temperature of the inorganic binder.

The inorganic particles include at least one oxide of manganese, iron, copper, cobalt, and chromium. The surface coat layer has an emissivity of about 0.7 or more.

The inorganic binder has a softening temperature of higher than about 1000° C.

The following will discuss the effects of the exhaust pipe paint according to the present embodiment, of a method for forming a surface coat layer on an exhaust pipe base, and of the exhaust pipe. It is to be noted that since the effect of the method for forming a surface coat layer on an exhaust pipe base according to the present embodiment is the same as the effect of the exhaust pipe paint of the present embodiment, description thereof will be omitted.

(1) The exhaust pipe paint of the present embodiment includes: inorganic glass particles made of a low-melting glass whose softening temperature is from about 300° C. to about 1000° C.; inorganic particles; and an inorganic binder whose softening temperature exceeds about 1000° C., wherein the inorganic glass particles and the inorganic particles are bound by the inorganic binder. Therefore, the exhaust pipe paint of the present embodiment is securely fixed to an exhaust pipe base.

When the exhaust pipe base to which the exhaust pipe paint of the present embodiment has been applied and then dried is attached to an engine exhaust port without performing a heating treatment on the exhaust pipe base, exhaust gas G having a temperature of about 600° C. passes through the exhaust pipe base in engine startup operation, and the exhaust pipe paint is heated to about 600° C.

Since the inorganic binder has a softening temperature of higher than about 1000° C., it does not soften at about 600° C.

When the temperature of the exhaust pipe paint reaches about 600° C. or rises higher after the engine shifts to steady-state operation, it does not soften. Therefore, the inorganic glass particles and the inorganic particles are more likely to continue to be bound by the inorganic binder, and it is presumed that the dried exhaust pipe paint (dispersoid layer) is less likely to peel from the exhaust pipe base even with engine vibration.

When the exhaust pipe paint reaches a temperature of from about 300° C. to about 1000° C. and also the softening temperature of the low-melting glass, inorganic glass particles soften and are integrated to form a glass substrate (inorganic glass), so that a surface coat layer is presumably formed in which inorganic particles and an inorganic binder are mixed inside the glass substrate.

As thus described, in the exhaust pipe paint of the present embodiment, the exhaust pipe can be manufactured by taking advantage of heat of exhaust gas.

(2) With the exhaust pipe paint of the present embodiment, an exhaust pipe can be manufactured by taking advantage of the heat of exhaust gas without performing a heating treatment that requires high energy.

Therefore, it is easier to reduce the environmental impact by controlling the emission amount of $CO_2$ and the like.

(3) In the exhaust pipe of the present embodiment, the surface coat layer includes a low-melting glass having a softening temperature of about 1000° C. or less. Therefore, in comparison with the case where the surface coat layer includes an inorganic glass having a softening temperature higher than the softening temperature of the low-melting glass, especially in engine steady-state operation and high-speed engine operation when the exhaust gas has a high temperature of about 1000° C., it is presumed that the low-melting glass tends to soften and the viscosity of the surface coat layer is more likely to decrease.

However, since the surface coat layer includes an inorganic binder having a softening temperature exceeding about 1000° C., a temperature higher than that of the low-melting glass, even when the low-melting glass softens with the heat of exhaust gas in steady-state operation and high-speed operation, it is presumed that the inorganic binder is less likely to soften or dissolve in the low-melting glass. Accordingly, inorganic particles and an inorganic binder are presumably mixed in the softened low-melting glass. Thus, it is supposed that the low-melting glass and the inorganic particles are bound by the inorganic binder and the viscosity of the surface coat layer is more easily maintained.

Thus, not only in engine startup operation and steady-state operation but also in high-speed engine operation, where the temperature of the exhaust pipe may temporarily exceed about 1000° C., the surface coat layer is less likely to drop from the exhaust pipe base even with engine vibration.

(4) In the exhaust pipe of the present embodiment, the surface coat layer includes inorganic particles that have a comparatively high emissivity among the inorganic materials. The inorganic particles contain at least one oxide of manganese, iron, copper, cobalt, and chromium. The surface coat layer has an emissivity of about 0.7 or more.

Therefore, in the exhaust pipe of the present embodiment, even when hot exhaust gas flows in the exhaust pipe in steady-state operation and high-speed operation of the engine, since heat of exhaust gas tends to be efficiently radiated to the outside through the surface coat layer (inorganic particles), the temperature of the exhaust gas discharged from the exhaust pipe easily falls and is easily controlled within the range of a catalyst activation temperature.

The following will describe Examples in which the first embodiment of the present invention is more specifically disclosed, and the present embodiment is not intended to be limited only by these Examples.

EXAMPLES

Example 1

1. Manufacture of Exhaust Pipe Paint (1-1) As inorganic glass particles made of a low-melting glass, 60 parts by weight of a $B_2O_3$—$Bi_2O_3$ type glass powder (BAS115 manufactured by Asahi Glass Co., Ltd.) having a softening temperature of 400° C. was weighed. Separately, as inorganic particles, 30 parts by weight of an $MnO_2$ powder, 5 parts by weight of FeO powder, and 5 parts by weight of a CuO powder were weighed. These powders were dry mixed to manufacture mixed powder.

(1-2) As an inorganic binder precursor, 70 parts by weight of lithium alkoxide was added to the mixed powder. The obtained mixture was mixed to manufacture an exhaust pipe paint.

Here, presumably, the lithium alkoxide is changed to lithium oxide by hydrolysis or the like, and the lithium oxide functions as an inorganic binder. Therefore, after the inorganic binder precursor is changed to the inorganic binder, the inorganic binder is presumed to have a softening temperature higher than about 1000° C.

2. Manufacture of Painted Pipe Sample (2-1) An exhaust pipe base having a plate shape (100 mm in width, 100 mm in length, and 2 mm in thickness) and made of stainless steel (SUS430) was prepared. The exhaust pipe base was ultrasonically cleaned in an alcohol solvent. Then, a sandblast treatment was carried out on the peripheral surface of the exhaust pipe base to give a roughened surface.

Here, the sandblast treatment was performed for 10 minutes using #100 $Al_2O_3$ abrasive grains.

(2-2) Next, 0.3 g of the exhaust pipe paint manufactured in (1-2) was uniformly applied to the surface of the sandblasted exhaust pipe base by spray coating.

(2-3) After performing a pre-drying treatment on the exhaust pipe base to which the exhaust pipe paint was applied, at room temperature for 24 hours, the painted pipe sample was manufactured by performing a drying treatment at 150° C. for 20 minutes in a drying apparatus.

3. Evaluation of Painted Pipe Sample (Evaluation on Emissivity)

The emissivity of a painted pipe sample was measured by using an emissivity meter D&S AERD manufactured by Kyoto Electronics Manufacturing Co., Ltd.

The obtained emissivity of the painted pipe sample was 0.80.

(Evaluation on Peeling of Dispersoid Layer)

The painted pipe sample was disposed on a Dupont-type impact tester (Dupont impact tester manufactured by TP Giken), and a 500-g weight was dropped on the painted pipe sample from a height of 400 mm. In this manner, the presence of peeling of a dispersoid layer upon the weight drop impact was evaluated.

As a result, peeling of the dispersoid layer did not occur in the painted pipe sample manufactured in Example 1.

Then, an exhaust pipe sample was manufactured by using the painted pipe sample manufactured in (2-3). Description of manufacture of the exhaust pipe sample will be given.

4. Manufacture of Exhaust Pipe Sample

The painted pipe sample manufactured in (2-3) was heated in a heating furnace at a temperature of 700° C. for 30 minutes to manufacture an exhaust pipe sample.

In the manufactured exhaust pipe sample, the thickness of the surface coat layer was 25 μm.

5. Evaluation of Exhaust Pipe Sample (Evaluation on Emissivity)

In the same manner as in the evaluation on the emissivity of the painted pipe sample, the emissivity of the surface coat layer in the exhaust pipe sample was also evaluated.

As a result, the emissivity of the surface coat layer of the exhaust pipe sample manufactured in Example 1 was 0.82.

In the manufactured exhaust pipe sample, the thickness of the surface coat layer was 25 μm.

Comparative Example 3

An exhaust pipe sample was manufactured in the same manner as in Example 1, except that in (2-2) of Example 1, a painted pipe sample and an exhaust pipe sample were manufactured without applying an exhaust pipe paint to an exhaust pipe base.

That is, the exhaust pipe sample was obtained by performing a sandblast treatment, in the same manner as in Example 1, on the peripheral surface of the exhaust pipe base having a plate shape (100 mm in width, 100 mm in length, and 2 mm in thickness) and made of stainless steel (SUS430).

Table 1 shows the composition of the exhaust pipe paint manufactured in Example 1 and Comparative Examples 1 and 2.

Table 1 also shows Comparative Example 3 for reference.

TABLE 1

| | Composition of exhaust pipe paint | | | | | | | |
|---|---|---|---|---|---|---|---|---|
| | Exhaust pipe paint | Inorganic glass particles | | Inorganic particles | | Binder (binder precursor) | | Blending ratio (weight ratio) of inorganic glass particles:inorganic particles:binder |
| | | Type | Softening temperature | Type | Blending ratio (weight ratio) | Use | Type | |
| Example 1 | used | $Bi_2O_3$—$B_2O_3$ type | 400° C. | $MnO_2$—CuO—FeO | 6:1:1 | used | Lithium alkoxide | 6:4:7 |
| Comparative Example 1 | used | $Bi_2O_3$—$B_2O_3$ type | 400° C. | $MnO_2$—CuO—FeO | 6:1:1 | not used | NA | 6:4:0 |
| Comparative Example 2 | used | $Bi_2O_3$—$B_2O_3$ type | 400° C. | $MnO_2$—CuO—FeO | 6:1:1 | used | Methylcellulose solution | 6:4:7 |
| Comparative Example 3 | not used | NA | NA | NA | NA | NA | NA | NA |

NA = Not Available (Evaluation on Dropping of Surface Coat Layer)

The exhaust pipe sample manufactured in 4 mentioned above was tilted 60° when placed in the heat furnace having a temperature of 1000° C. and was maintained in this state for 60 minutes. Then, dropping of the surface coat layer on the surface of the exhaust pipe base was evaluated.

As a result, the surface coat layer did not drop from the painted pipe sample manufactured in Example 1.

Comparative Example 1

An exhaust pipe paint, a painted pipe sample, and an exhaust pipe sample were manufactured in the same manner as in Example 1, except that in (1-2) of Example 1, 70 parts by weight of water instead of an inorganic binder precursor was added to mixed powder, and then mixed.

In the manufactured exhaust pipe sample, the thickness of the surface coat layer was 25 μm.

Comparative Example 2

An exhaust pipe paint, a painted pipe sample, and an exhaust pipe sample were manufactured in the same manner as in Example 1, except that in (1-2) of Example 1, as an organic binder instead of an inorganic binder precursor, a methyl cellulose solution manufactured by mixing 0.9 parts by weight of methyl cellulose and 70 parts by weight of water was added to mixed powder, and then mixed.

Painted pipe samples manufactured in Comparative Examples 1 and 2 were evaluated for emissivity and peeling of dispersoid layers in the same manner as in Example 1.

Exhaust pipe samples manufactured in Comparative Examples 1 and 2 were evaluated for emissivity and dropping of surface coat layers in the same manner as in Example 1.

An exhaust pipe sample manufactured in Comparative Examples 3 was evaluated for emissivity in the same manner as in Example 1.

Table 2 shows the results of each Comparative Example in addition to the results of Example 1.

TABLE 2

| | Painted pipe sample | | Exhaust pipe sample | |
|---|---|---|---|---|
| | Emissivity | Dispersoid layer | Emissivity | Surface coat layer |
| Example 1 | 0.80 | not peeled | 0.82 | not dropped |
| Comparative Example 1 | 0.70 | peeled | 0.84 | dropped |
| Comparative Example 2 | 0.70 | peeled | 0.84 | dropped |
| Comparative Example 3 | NA | NA | 0.21 (Note) | NA |

(Note) Since the surface coat layer was not formed, the emissivity of the exhaust pipe base was measured.
NA = Not Available The results shown in Table 2 clearly indicate that in the exhaust pipe sample manufactured in Comparative Example 3, a surface coat layer was not formed and the emissivity was as low as 0.21.

On the other hand, the emissivities of the painted pipe samples manufactured in Example 1 and Comparative Examples 1 and 2 were 0.7 or more probably because the exhaust pipe paint includes inorganic particles of manganese dioxide, copper oxide, and iron oxide. The emissivities of the exhaust pipe samples manufactured by using these exhaust pipe paints were 0.7 or more, and were higher than that of the exhaust pipe sample manufactured in Comparative Example 3.

The exhaust pipe paint manufactured in Example 1 included an inorganic binder precursor that presumably has a softening temperature of higher than about 1000° C. after being changed to an inorganic binder. Therefore, the inorganic binder did not soften even after a drying treatment at a temperature of 150° C., and the inorganic glass particles and the inorganic particle continued to be bound by the inorganic binder. Probably because of these reasons, the dispersoid layer did not peel even upon application of mechanical shock to the manufactured painted pipe sample.

Presumably because the exhaust pipe paint manufactured in Example 1 included a low-melting glass having a softening temperature of 400° C., it was possible to form a surface coat layer by performing a heating treatment on the manufactured painted pipe sample at a temperature of 700° C.

On the other hand, the exhaust pipe paint manufactured in Comparative Example 1 did not include an inorganic binder, and the inorganic glass particles and the like that were powdered by performing a drying treatment at a temperature of 150° C. were not bound. Presumably because of the reasons, the dispersoid layer peeled upon application of mechanical shock to the manufactured painted pipe sample.

In the painted pipe sample manufactured in Comparative Example 2, the exhaust pipe paint did not include an inorganic binder but instead included a methylcellulose solution as an organic binder. Probably because water (a solvent) volatilized and the binding ability of the organic binder decreased upon performing a drying treatment at a temperature of 150° C., the dispersoid layer peeled upon application of mechanical shock to the manufactured painted pipe sample.

In the exhaust pipe sample manufactured in Example 1, the surface coat layer did not drop upon being heated at a temperature of 1000° C.

It was presumably because the surface coat layer included an inorganic binder that probably had a softening temperature exceeding about 1000° C. which was higher than a softening temperature of the low-melting glass, the inorganic binder did not dissolve in the low-melting glass even upon being heated to the above-mentioned temperature, the low-melting glass and the inorganic particles were bound by the inorganic binder, and the viscosity of the surface coat layer was maintained.

On the other hand, in the exhaust pipe samples manufactured in Comparative Examples 1 and 2, the surface coat layer dropped probably because the surface coat layer did not include the inorganic binder. That is, the inorganic glass and the inorganic particles were not bound, and when the samples were heated to a temperature of 1000° C., the viscosity of the surface coat layer fell.

Other Embodiments

In the exhaust pipe paint according to the embodiment of the present invention, the material of the inorganic glass particles is not particularly limited as long as they are softened by the heat of engine exhaust gas. Examples thereof include conventionally known inorganic glasses, such as soda-lime glass, alkali-free glass, borosilicate glass, potash glass, lead crystal glass, titanium crystal glass, barium glass, boron glass, strontium glass, alumina silica glass, soda zinc glass, and soda barium glass.

Of these glasses, low-melting glasses having a softening temperature of about 1000° C. or less are preferable, and particularly those having a softening temperature of from about 300° C. to about 1000° C. are more preferable. The reason for this has been already stated and therefore is omitted here.

When the diesel engine is used as the above-mentioned engine, the low-melting glass preferably has a softening temperature of from about 200° C. to about 800° C. When the softening temperature of the inorganic glass particles is within the range, the surface coat layer is more easily formed by using the heat of diesel engine exhaust gas.

Examples of the low-melting glass include $SiO_2$—$B_2O_3$—$ZnO$ type glass, $SiO_2$—$B_2O_3$—$Bi_2O_3$ type glass, $SiO_2$—$PbO$ type glass, $SiO_2$ $PbO$—$B_2O_3$ type glass, $SiO_2$—$B_2O_3$—$PbO$ type glass, $B_2O_3$—$ZnO$—$PbO$ type glass, $B_2O_3$—$ZnO$—$Bi_2O_3$ type glass, $B_2O_3$—$Bi_2O_3$ type glass, $B_2O_3$—$ZnO$ type glass, $BaO$—$SiO_2$ type glass, and the like.

The inorganic glass particles may be made of one kind of the low-melting glass or a plurality of kinds of the low-melting glasses out of the above-mentioned low-melting glasses.

The softening temperature used herein refers to a temperature at which the viscosity of the inorganic glass reaches about $4.5 \times 10^6$ Pa·s.

In the exhaust pipe paint according to the embodiment of the present invention, the desirable lower limit of the blending amount of the inorganic glass particles is about 10% by weight and the desirable upper limit thereof is about 62% by weight, with respect to the total amount of the inorganic glass particles, the inorganic particles, and the inorganic binder (inorganic binder precursor).

Since the amount of the inorganic glass particles is not too small when the blending amount of the inorganic glass particles is not less than 10% by weight, a surface coat layer is less likely to drop from the manufactured exhaust pipe. On the other hand, when the blending amount of the inorganic glass particles is not more than 62% by weight, the amount of the inorganic particles may not decrease too much and heat dissipation of the exhaust pipe is less likely to fall. Further, when it is not more than 62% by weight, the amount of the inorganic binder may not decrease too much, and the inorganic glass particles and the inorganic particles are more likely to be sufficiently bound.

A more desirable lower limit of the inorganic glass particles is about 12% by weight, and a more desirable upper limit thereof is about 47% by weight.

In the exhaust pipe paint according to the embodiment of the present invention, the inorganic particles are not limited to inorganic particles which include at least one oxide of manganese, iron, copper, cobalt, and chromium, and may be inorganic particles which include an oxide of nickel and the like.

Moreover, the inorganic particles may be inorganic particles (metal particles) which include aluminum or the like.

Since the emissivity is comparatively low when the inorganic particles which include aluminum or the like are used, heat is less likely to be radiated from the inorganic particles. Therefore, when the exhaust pipe paint with such metal particles is used for an exhaust pipe of a diesel engine that emits exhaust gas having a comparatively low exhaust gas temperature, it is easier to prevent the temperature of exhaust gas from being less than the lower limit of a catalyst activation temperature.

In the exhaust pipe paint according to the embodiment of the present invention, the desirable lower limit of the blending amount of the inorganic particles is about 10% by weight and the desirable upper limit thereof is about 62% by weight, with respect to the total amount of the inorganic glass particles, the inorganic particles, and the inorganic binder (inorganic binder precursor).

Since the amount of the inorganic particles having heat dissipation is not too small when the amount of the inorganic particles is not less than about 10% by weight, heat dissipation of the exhaust pipe is less likely to fall. On the other hand, since the amount of the inorganic binder does not decrease too much when the blending amount of the inorganic particles is not more than about 62% by weight, the inorganic glass particles and inorganic particles are more likely to be sufficiently bound. Further, the amount of the inorganic glass particles may not decrease too much, and the surface coat layer is less likely to drop from the manufactured exhaust pipe.

A more desirable lower limit of the blending amount of the inorganic particles is about 12% by weight, and a more desirable upper limit thereof is about 47% by weight.

In the exhaust pipe paint according to the embodiment of the present invention, when the inorganic glass particles are made of a low-melting glass, the softening temperature of the inorganic binder is not particularly limited as long as it is higher than the softening temperature of the low-melting glass. It is preferably higher than about 500° C., for example. As described above, the softening temperature is more preferably higher than about 1000° C.

This is because it is presumed that when an engine shifts from startup operation to steady-state operation, the inorganic binder does not soften even if the temperature of the exhaust pipe paint rises to about 1000° C. Thus, the inorganic glass particles and the inorganic particles are more likely to continue to be bound by the inorganic binder. In the manufactured exhaust pipe, even in engine steady-state operation or the like when the exhaust gas has a high temperature of about 1000° C., it is presumed that the inorganic binder does not soften and the viscosity of the surface coat layer is less likely to decrease.

When a diesel engine is used, the softening temperature of the inorganic binder is preferably higher than the upper limit of the temperature of the diesel engine exhaust gas, and more preferably higher than about 800° C., for example.

In the exhaust pipe paint according to the embodiment of the present invention, the desirable lower limit of the blending amount of the inorganic binder (inorganic binder precursor) is about 23% by weight and the desirable upper limit thereof is about 50% by weight, with respect to the total amount of the inorganic glass particles, the inorganic particles, and the inorganic binder (inorganic binder precursor).

Since the amount of the inorganic binder is not too small when the blending amount of the inorganic binder is not less than about 23% by weight, the inorganic glass particles and the inorganic particles are more likely to be sufficiently bound. On the other hand, since the amount of the inorganic glass particles does not decrease too much when the blending amount of the inorganic binder is not more than about 50% by weight, a surface coat layer is less likely to drop from the manufactured exhaust pipe. Moreover, the amount of the inorganic particles may not decrease too much, and heat dissipation of the exhaust pipe is less likely to fall.

A more desirable lower limit of the inorganic glass particles is about 30% by weight, and a more desirable upper limit thereof is about 45% by weight.

The viscosity of the exhaust pipe paint according to the embodiment of the present invention is not particularly limited as long as the exhaust pipe paint can be applied to the exhaust pipe base. The viscosity may be suitably adjusted based on the method for applying the exhaust pipe paint to be mentioned later.

In order to adjust viscosity, a dispersing solvent and an organic binder may be added to the exhaust pipe paint according to the embodiment of the present invention. Examples of the dispersing solvent include water and organic solvents, such as methanol, ethanol, and acetone. The blending ratio of the mixed powder to the dispersing solvent is not particularly limited, and desirably, for example, from about 50 parts by weight to about 150 parts by weight of the dispersing solvent with respect to 100 parts by weight of the mixed powder. It is because the desirable amount can give a viscosity suitable for applying the exhaust pipe paint to the exhaust pipe base.

Examples of the organic binder include polyvinyl alcohol, methylcellulose, ethyl cellulose, carboxymethyl cellulose, and the like. These may be used independently or two or more kinds thereof may be used in combination.

The dispersing solvent and the organic binder may be used in combination. In this case, the exhaust pipe paint is more likely to be surely applied to the exhaust pipe base, and it is therefore easier to surely prevent the exhaust pipe paint from dropping even with engine vibration.

In the exhaust pipe according to the embodiment of the present invention, the emissivity of the surface coat layer may be high or low.

When the emissivity of the surface coat layer is comparatively as high as about 0.5 or more, since the heat of exhaust gas tends to be efficiently radiated to the outside through the surface coat layer (inorganic particles), the temperature of the exhaust gas discharged from the exhaust pipe easily falls and is easily controlled within the range of a catalyst activation temperature. In this case, the emissivity of the surface coat layer is more preferably about 0.7 or more, and further preferably about 0.8 or more.

In this case, in the method for forming a surface coat layer on an exhaust pipe base according to the embodiment of the present invention, the emissivity of the exhaust pipe paint (dispersoid layer) after application of the paint to the exhaust pipe base and a drying treatment is preferably about 0.5 or more.

It is because the surface coat layer having an emissivity of about 0.5 or more can be formed more easily by using the exhaust pipe paint. The emissivity of the exhaust pipe paint is more desirably about 0.7 or more, and more preferably about 0.8 or more.

On the other hand, when the emissivity of the surface coat layer is comparatively low, less than about 0.5, the heat of exhaust gas is less likely to be radiated to the outside through the surface coat layer (inorganic particles), and the temperature of the exhaust gas to be discharged from the exhaust pipe increases. By using the paint for the exhaust pipe of an engine such as a diesel engine that emits exhaust gas having a comparatively low temperature, it is easier to prevent the temperature of exhaust gas from being less than the lower limit of a catalyst activation temperature. In this case, the emissivity of the surface coat layer is more preferably about 0.4 or less, and further preferably about 0.3 or less.

In this case, in the method for forming a surface coat layer on an exhaust pipe base according to the embodiment of the present invention, the emissivity of the exhaust pipe paint (dispersoid layer) after application of the paint to the exhaust pipe base and a drying treatment is preferably less than about 0.5.

It is because the surface coat layer having an emissivity of less than about 0.5 may be formed more easily by using the exhaust pipe paint. The emissivity of the exhaust pipe paint is more preferably about 0.4 or less, and further preferably about 0.3 or less.

The drying treatment used herein means that a dispersing solvent, a solvent, and the like, which are contained in an exhaust pipe paint, volatilize, the exhaust pipe paint is dried and solidified, and a dispersoid layer is formed on the surface of an exhaust pipe base.

Examples of a drying apparatus used for a drying treatment include a microwave drying apparatus, a hot-air drying apparatus, a dielectric drying apparatus, a reduced pressure drying apparatus, a vacuum drying apparatus, and the like.

The shape of the painted pipe (exhaust pipe) according to the embodiment of the present invention is not limited to the above-mentioned substantially-cylindrical shape, and is not particularly limited as long as it is tubular. The cross-sectional shape may be any shape, such as a substantially-elliptical shape and a substantially-polygonal shape.

When the cross-sectional shape of the exhaust pipe base has a shape other than a perfect circle, a contact area of the exhaust pipe with the cross section with exhaust gas is large, and the heat of exhaust gas is efficiently transmitted to the exhaust pipe base and the surface coat layer. Therefore, the heat radiation makes it easier to efficiently reduce the temperature of the exhaust gas to a catalyst activation temperature.

In the exhaust pipe according to the embodiment of the present invention, the surface coat layer desirably has a thickness of from about 1 μm to about 100 μm.

When the surface coat layer has a thickness of from about 1 μm to about 100 μm, it excels in the above-mentioned heat dissipation.

When the surface coat layer has a thickness of not less than about 1 μm, the region of the exhaust pipe base on which the surface coat layer is formed is less likely to be oxidized because the surface coat layer is not too thin. As a result, the surface coat layer is less likely to drop. On the other hand, when the surface coat layer has a thickness of not more than about 100 μm, the temperature difference is less likely to be generated in the surface coat layer, and cracks due to a big thermal shock caused by the temperature difference is less likely to occur in the surface coat layer.

When the surface coat layer is not too thin, the heat insulation property in a low-temperature region is less likely to be low. When the heat insulation property in the low-temperature region is low, it is less likely to take time to increase the temperature of exhaust gas that flows into a catalytic converter or the like to a catalyst activation temperature immediately after starting the engine.

In the painted pipe according to the embodiment of the present invention, the exhaust pipe paint desirably has a thickness of from about 1.1 μm unto about 300 μm. This is because, by heating an exhaust pipe paint having a thickness within the above-mentioned range, it is possible to suitably manufacture an exhaust pipe in which the surface coat layer has a thickness of from about 1 μm to about 100 μm.

In the exhaust pipe according to the embodiment of the present invention, the thermal conductivity of the surface coat layer is desirably lower than the thermal conductivity of the exhaust pipe base. The reason for this is presumably as follows.

When the thermal conductivity of the surface coat layer is lower than the thermal conductivity of the exhaust pipe base, in the case where exhaust gas passes through the exhaust pipe and the exhaust pipe base is heated, the heat conduction rate of the exhaust pipe base is high; whereas the heat conduction rate from the exhaust pipe base to the outside through the surface coat layer is low. Therefore, in a low-temperature region (lower than around 500° C. in the present description) in which thermal conduction contributes to a heat transfer very much, the surface coat layer is allowed to have excellent heat insulation property. When the surface coat layer has excellent heat insulation property as described above, the surface coat layer is presumably capable of easily raising the temperature of exhaust gases to a catalyst activation temperature in a short period of time after starting a vehicle engine and the like.

Since the emissivity of the surface coat layer is higher than the emissivity of the exhaust pipe base in the exhaust pipe according to the embodiment of the present invention as above described, the exhaust pipe is allowed to have excellent heat dissipation in a high-temperature region in which heat radiation better contributes to heat transfer than heat conduction, even when the thermal conductivity of the surface coat layer is lower than the thermal conductivity of the exhaust pipe base.

A value of the thermal conductivity of the surface coat layer at room temperature is desirably from about 0.1 W/mK to about 4 W/mK.

The thermal conductivity of the surface coat layer at room temperature can be measured by using a known method such as a hot-wire method, and a laser flash method.

In the exhaust pipe (painted pipe) according to the embodiment of the present invention, the surface coat layer (exhaust pipe paint) is not necessarily formed on the entire peripheral surface of the exhaust pipe base and may be formed only on a part of the peripheral surface of the exhaust pipe base.

However, when the surface coat layer is formed only on a part of the peripheral surface of the exhaust pipe base, the area of the portion in which the surface coat layer is formed is desirably not less than about 10% of the area of the entire peripheral surface of the exhaust pipe base.

It is because when the area of the portion in which the surface coat layer is formed is not less than about 10%, the heat dissipation of the exhaust pipe is less likely to be insufficient, and the temperature rise of the exhaust pipe is more likely to be sufficiently controlled.

The area of the portion in which the surface coat layer is formed is preferably not less than about 50% and more preferably not less than about 80% of the area of the entire peripheral surface of the exhaust pipe base.

When the surface coat layer is formed on a part of the peripheral surface of the exhaust pipe base, the formed region is not particularly limited. The surface coat layer may be formed on one region or a plurality of regions selected from the entire peripheral surface of the exhaust pipe base. Alternatively, the surface coat layer may be formed so as to draw a regular mesh pattern or an irregular pattern on the entire peripheral surface of the exhaust pipe base.

Further, through holes (pinholes) penetrating the surface coat layer at equal intervals or at random may be formed in the surface coat layer formed on the entire peripheral surface of the exhaust pipe base.

When the exhaust pipe (painted pipe) according to the embodiment of the present invention is an exhaust manifold (painted pipe for an exhaust manifold), the maximum height Rz of the inner face (inner face of the exhaust pipe base) is desirably about 0.1 μm or more.

The reason for this is that, when the maximum height Rz of the inner face is in this range, heat of exhaust gas can be easily conducted to the exhaust pipe base, facilitate heat dissipation, lower the temperature of exhaust gas, and control the temperature within the range of a catalyst activation temperature. A preferable upper limit of the maximum height Rz of the inner face is about 15 μm.

The exhaust pipe according to the embodiment of the present invention is not limited to an exhaust manifold, and can be suitably used as a pipe for forming the catalyst converter, as a turbine housing, or the like.

In the exhaust pipe (painted pipe) according to the embodiment of the present invention, the difference between the coefficient of thermal expansion of the exhaust pipe base and the coefficient of thermal expansion of the surface coat layer is desirably about $10 \times 10^{-6}/°$ C. or less.

When the difference between the coefficients of thermal expansion is in the above-mentioned range, even in the case where hot exhaust gas passes through the exhaust pipe, dropping of the surface coat layer from the exhaust pipe base, and deformation and breakage of the surface coat layer and the exhaust pipe base are less likely to occur, so that it is possible to obtain a more reliable exhaust pipe.

Upon manufacturing the painted pipe (exhaust pipe) according to the embodiment of the present invention, it is desirable to perform a cleaning treatment before the roughening treatment. It is because it is possible to remove impurities on a surface of the exhaust pipe base and improve the adhesion of the exhaust pipe paint.

The cleaning treatment is not particularly limited, and a conventionally known cleaning treatment can be used. Specific examples thereof include a method of ultrasonic cleaning in an alcohol solvent, and the like.

At least one of plating, such as nickel plating and chrome plating, and oxidation of the peripheral surface of the exhaust pipe base may be performed before the treatment of applying the exhaust pipe paint to the peripheral surface of an exhaust pipe base.

The reason for this is that the adhesion between the exhaust pipe base and the exhaust pipe paint (surface coat layer) is more likely to be improved.

Examples of a method for applying the exhaust pipe paint upon manufacturing the painted pipe (exhaust pipe) according to the embodiment of the present invention include: electrostatic coating; ink jet; transfer using a stamp, a roller or the like; brush coating; and the like, in addition to the spray coating.

In addition, the exhaust pipe base may be immersed in the exhaust pipe paint so as to be coated with the exhaust pipe paint.

Further, when preparing the exhaust pipe paint, the exhaust pipe paint may be prepared as a composition for electrodeposition. Then, the exhaust pipe base may be immersed in the composition for electrodeposition and the peripheral surface of the exhaust pipe base may be coated with the exhaust pipe paint by electrodeposition.

In this case, when the composition for electrodeposition is prepared, the exhaust pipe paint needs to be blended with an additive for zeta potential control and for adjustment of a resistance value of the solution, and a stabilizer for securing dispersibility of inorganic glass particles and inorganic particles.

More specifically, the composition for electrodeposition may be prepared, for example, by adding a mixture of acetone and iodine to an exhaust pipe paint.

In order to apply an exhaust pipe paint by electrodeposition, an exhaust pipe base, a steel wire functioning as a positive electrode, and the like are placed in a solution which is prepared by adding acetone and iodine to the exhaust pipe paint. Further, the exhaust pipe base is allowed to function as a negative electrode, and an electric voltage may be applied.

Further, a solution prepared by dispersing the exhaust pipe paint in water and adding an organic dispersant may be used as the composition for electrodeposition.

An aerosol deposition method (AD) may also be used as a method for applying the exhaust pipe paint to the peripheral surface of the exhaust pipe base.

In this case, when preparing an exhaust pipe paint, it is desirable to prepare an exhaust pipe paint in a form of particles having a particle diameter of about 1 μm or less. The reason for this is that activity of the exhaust pipe paint is more likely to be improved.

In the case of using the AD, particles of an exhaust pipe paint collide with an exhaust pipe base in vacuum, and thus the exhaust pipe paint is applied.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for forming a surface coat layer on an exhaust pipe base, the method comprising:
    applying an exhaust pipe paint to a peripheral surface of an exhaust pipe base to manufacture a painted pipe, said exhaust pipe paint comprising an inorganic glass particle, an inorganic particle, and at least one of an inorganic binder and an inorganic binder precursor, said inorganic glass particle comprising a low-melting glass, and a softening temperature of said low-melting glass being lower than a softening temperature of said inorganic binder;
    attaching said painted pipe to an exhaust port of an engine; and
    forming a surface coat layer by discharging exhaust gas from said exhaust port of the engine and thereby passing said exhaust gas through said painted pipe.

2. The method for forming a surface coat layer on an exhaust pipe base according to claim 1,
    wherein at least one of plating and oxidation of the peripheral surface of said exhaust pipe base is performed in advance.

3. The method for forming a surface coat layer on an exhaust pipe base according to claim 1,
    wherein the exhaust pipe paint is applied to the exhaust pipe base by using a method of spray coating, electrostatic coating, ink jet, transfer using a stamp or a roller, or brush coating.

4. The method for forming a surface coat layer on an exhaust pipe base according to claim 1,
    wherein said exhaust pipe paint comprises a composition for electrodeposition, and
    wherein the exhaust pipe paint is applied to the exhaust pipe base by immersing the exhaust pipe base in said composition for electrodeposition to perform electrodeposition.

5. The method for forming a surface coat layer on an exhaust pipe base according to claim 1,
    wherein an aerosol deposition method is employed to manufacture a painted pipe.

6. The method for forming a surface coat layer on an exhaust pipe base according to claim 1, wherein said inorganic particle comprises at least one oxide of manganese, iron, copper, cobalt, and chromium.

7. The method for forming a surface coat layer on an exhaust pipe base according to claim 1,
wherein said inorganic binder comprises lithium oxide particles or an inorganic binder derived from said inorganic binder precursor, said inorganic binder precursor including lithium alkoxide.

8. A method for forming a surface coat layer on an exhaust pipe base, the method comprising:
applying an exhaust pipe paint to an exhaust pipe base to manufacture a painted pipe, said exhaust pipe paint comprising an inorganic glass particle, an inorganic particle, and at least one of an inorganic binder and an inorganic binder precursor;
attaching said painted pipe to an exhaust port of an engine; and
discharging exhaust gas from said exhaust port of the engine and thereby passing said exhaust gas through said painted pipe,
wherein said exhaust pipe paint comprises a composition for electrodeposition, and
wherein the exhaust pipe paint is applied to the exhaust pipe base by immersing the exhaust pipe base in said composition for electrodeposition to perform electrodeposition.

9. A method for forming a surface coat layer on an exhaust pipe base, the method comprising:
applying an exhaust pipe paint to an exhaust pipe base to manufacture a painted pipe, said exhaust pipe paint comprising an inorganic glass particle, an inorganic particle, and at least one of an inorganic binder and an inorganic binder precursor;
attaching said painted pipe to an exhaust port of an engine; and
discharging exhaust gas from said exhaust port of the engine and thereby passing said exhaust gas through said painted pipe,
wherein an aerosol deposition method is employed to manufacture a painted pipe.

10. An exhaust pipe comprising:
an exhaust pipe base; and
a surface coat layer formed on a peripheral surface of said exhaust pipe base by passing exhaust gas through said exhaust pipe base which an exhaust pipe paint is applied to the peripheral surface of said exhaust pipe base, the exhaust pipe paint comprising an inorganic glass particle, an inorganic particle, and at least one of an inorganic binder and an inorganic binder precursor, said inorganic glass particle comprising a low-melting glass, and a softening temperature of said low-melting glass being lower than a softening temperature of said inorganic binder.

11. The exhaust pipe according to claim 10,
wherein said inorganic particle comprises at least one oxide of manganese, iron, copper, cobalt, and chromium.

12. The exhaust pipe according to claim 10,
wherein said inorganic binder comprises lithium oxide particles or an inorganic binder derived from said inorganic binder precursor, said inorganic binder precursor including lithium alkoxide.

* * * * *